United States Patent [19]

Lee

[11] Patent Number: 4,952,185
[45] Date of Patent: Aug. 28, 1990

[54] SEPARATION OF COMPONENTS OF CATHODE RAY TUBES

[75] Inventor: Robert A. Lee, Bridgend, Wales

[73] Assignee: Sony Corporation, Tokyo, Japan

[21] Appl. No.: 829,161

[22] Filed: Feb. 14, 1986

[30] Foreign Application Priority Data

Nov. 7, 1985 [GB] United Kingdom ................ 8527488

[51] Int. Cl.⁵ ............................................. H01J 9/50
[52] U.S. Cl. ...................................................... 445/2
[58] Field of Search ................ 445/2; 156/344; 134/1, 134/3; 204/141.5

[56] References Cited

U.S. PATENT DOCUMENTS

| | | | |
|---|---|---|---|
| 2,884,312 | 4/1959 | Kuryla | 156/344 |
| 3,234,047 | 2/1966 | Olson | 134/1 |
| 3,823,080 | 7/1974 | Speigel | 204/141.5 |
| 4,045,243 | 8/1977 | Wohlert | 134/1 |
| 4,248,232 | 2/1981 | Engelbrecht | 156/344 |
| 4,537,511 | 8/1985 | Frei | 134/1 |

FOREIGN PATENT DOCUMENTS 0586206 12/1977 U.S.S.R. ............................ 204/141.5

Primary Examiner—Kurt Rowan
Attorney, Agent, or Firm—Hill, Van Santen, Steadman & Simpson

[57] ABSTRACT

In a method of separating a glass panel and a glass body of a cathode ray tube, the panel and body being secured together by an adhesive that comprises a frit and a binder that is susceptible to attack by nitric acid, the tube is at least partially immersed in a bath containing nitric acid such that at least the junction of the panel and body is immersed in the acid, and the acid is subjected to ultrasonic excitation, for example by transducers disposed in the acid in the bath.

3 Claims, 2 Drawing Sheets

SEPARATION OF COMPONENTS OF CATHODE RAY TUBES

BACKGROUND OF THE INVENTION

1. Field of the Invention

This invention relates to the separation of a glass panel and a glass body of a cathode ray tube, for example a cathode ray tube intended to act as a picture tube of a television receiver.

2. Description of the Prior Art

Cathode ray tubes (CRTs) intended to act as picture tubes of color television receivers conventionally are constructed by various different manufacturers in a manner that will now be described with reference to FIG. 1 of the accompanying drawings. The CRT is formed from a funnel-like glass body 10, referred to hereinafter more simply as a "funnel", and a glass face plate or panel 12. A metal electrode member 14, known as an anode button, extends through the wall of a main body portion 18 of the funnel 10 and is sealed in a vacuum-tight manner to the glass making up the wall.

To make the CRT, a carbon (graphite) coating (not shown) is applied to the interior of the funnel 10. The composition of the internal graphite coating may vary as between the main body portion 18 and a neck portion 20 which is designed to accommodate an electron gun (not shown). The funnel 10 then is heated in an oven so that the internal carbon coating will cure or set.

The funnel 10 then is joined to the panel 12, the interior of the panel previously having been coated in respective local areas with one or more phosphors, its own carbon (graphite) coating and, in some instances, aluminum. The funnel 10 is joined to the panel 12 by applying an adhesive to an end edge 22 of the funnel and/or to an edge 24 of the panel 12 so that the edges 22 and 24 are joined together by the adhesive. The adhesive comprises a frit and a binder liquid and, after it has been applied, the assembly of the funnel 10 and panel 12 is heated so that the adhesive will cure or set to firmly bond together the funnel 10 and panel 12 in such a manner as to provide a vacuum-tight seal between them.

The binder liquid typically comprises a binding agent (such as nitrocellulose) which is dissolved in a suitable solvent (such as isoamyl acetate). By way of example, though it should be appreciated that the numerical values quoted below may be varied in accordance with various relevant factors, the binder liquid may be formed by adding nitrocellulose to isoamyl acetate in the proportion of 12.6 g of nitrocellulose per liter of isoamyl acetate, and the adhesive may be formed by mixing the frit (powder form) and binder liquid in the proportions of 900 ml of the binder liquid per kilogram of frit powder.

Thereafter, the funnel 10 is evacuated and, whilst it is evacuated, the electron gun (not shown) is sealingly fitted into the neck portion 20 of the funnel and the flared end part of the neck portion is removed. Also, a carbon (graphite) coating (not shown) is applied to at least part of the exterior of the main body portion 18 of the funnel 10. The exterior graphite coating may be of a different composition to that or those on the interior of the funnel 10.

It sometimes happens that, for one reason or another, a CRT manufactured by the method just described will be found to be defective. For example, the seal formed by the adhesive joining together the funnel 10 and panel 12 may be defective so that a vacuum cannot be maintained in the CRT. Instead of throwing away the tube, many manufacturers will, in this event, try to salvage the funnel 10 and/or the panel 12 by separating them, whereupon the various coatings can be removed from the salvaged component and the component can be reintroduced into the manufacturing process at a suitable stage and used in making another CRT.

A process employed by several manufacturers to separate the funnel 10 and panel 12 is as follows. A batch of defective CRTs are oriented in a separation apparatus as shown in FIG. 1 and an aqueous solution of nitric acid ($HNO_3$) is poured on to the center of the panel 12 of each CRT so that it trickles down past the hardened adhesive joining the panel to the funnel 10. The nitric acid solution penetrates the adhesive to some extent and weakens it by attacking the binder that holds the frit together. However, the use of nitric acid solution alone is not sufficient to destroy the bond between the funnel 10 and panel 12, or at least is not sufficient to destroy the bond in a period of time which is not so long as to make the separation process uneconomical. To destroy the bond, the step of applying a nitric acid solution to the adhesive is followed by the application of a thermal shock. To provide the thermal shock, the flow of nitric acid solution is stopped and replaced by alternating flows of cold water and hot water. The alternate supply of hot and cold water provides differential thermal expansion which destroys the bond between the funnel 10 and the panel 12, which bond previously was weakened by the nitric acid solution, so that they can be separated.

The separation process described above has several disadvantages. Firstly, it is very time-consuming, typically taking about 20 minutes. Secondly, it is not very reliable. Thus, it is sometimes found for a particular CRT that the bond has not been destroyed, that is that the funnel 10 and panel 12 have not become separated, so that the CRT concerned has to be put back in the separation apparatus for at least one further period of around 20 minutes. Thirdly, the thermal shock treatment sometimes stresses the glass funnel 10 and/or the glass panel 12 to such an extent that it will crack and therefore cannot be salvaged. These various disadvantages can have such a cumulative effect that the economic justification for carrying out the salvage operation may become questionable.

SUMMARY OF THE INVENTION

It is an object of the invention to provide a method of separating a glass panel and a glass body of a CRT which is quicker than the prior art method described above.

Another object of the invention is to provide such a method which is more reliable than the prior art method described above.

A further object of the invention is to provide such a method which avoids the need to use a thermal shock treatment.

The present invention provides a method of separating a glass panel and a glass body of a cathode ray tube, the panel and body being secured together by an adhesive that comprises a frit and a binder that is susceptible to attack by nitric acid, in which the cathode ray tube is at least partially immersed in a bath containing nitric acid such that at least the junction of the panel and body is immersed in the nitric acid, and the nitric acid in the bath is subjected to ultrasonic excitation. It has been found that the ultrasonically-agitated nitric acid effectively destroys the adhesive quite quickly, so much so that if the degree of agitation is optimized the total time taken to destroy the adhesive may be reduced to less than 50% of the time taken by the known method described above. Typically, the separation time may be reduced to about six minutes or even less. Further, the destructive effect of the acid on the binder is so intensified by the ultrasonic agitation that the method should prove reliable in that it is unlikely that even a particularly tenacious bond will not be separated. Also, since no thermal shock has to be imparted to the components of the CRT to separate them, there is no risk of the components becoming cracked by stress induced by thermal shock.

It is within the scope of the invention for the ultrasonic excitation to be effected by one or more transducers disposed outside of the bath. Preferably, however, in order to maximize the degree of agitation of the nitric acid obtained per unit amount of power applied to the transducer or transducers, that is to maximize the extent to which the applied power is coupled to the CRT, the ultrasonic excitation is effected by means of at least one transducer that is disposed within the nitric acid within the bath or forms part of a wall of the bath. More preferably still, the at least one transducer is so disposed as to provide maximum excitation of the nitric acid in the region of the junction of the body and the panel.

In broad accordance with the way in which it is used in the art, the term "cathode ray tube" (or "CRT") as used herein is to be interpreted broadly as meaning any enclosure or envelope (which may or may not be of tubular shape) which comprises a glass panel and a glass body secured together by an adhesive that comprises a frit and a binder that is susceptible to attack by nitric acid, and which contains or is intended to contain an electron gun or other charged particle source for generating one or more beams of electrons or other charged particles for display purposes. Thus, although the invention is described herein by way of example with particular reference to CRTs intended to act as picture tubes of color television receivers, the invention is applicable to CRTs of various other types, including (for instance) certain special purpose CRTs which are disassembled (separation of panel and body) as a matter of routine for servicing and/or rebuilding. More specifically, without prejudice to the generality of the foregoing, the invention is applicable for instance to CRTs of the following types.
1. Shadow mask or similar tubes intended usually for use as picture tubes for domestic television receivers and the like, for example tubes of the TRINITRON (trade mark) kind.
2. Beam index color tubes and envelopes.
3. Monochromatic tubes and envelopes.
4. Penetration phosphor tubes and envelopes.
5. Field sequential color filter tubes and envelopes.
6. Dark trace color filter tubes and envelopes.
7. Flat evacuated color/monochromatic tubes and envelopes.
8. Plasma discharge tubes and envelopes.
9. All glass and metal tubes and envelopes.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
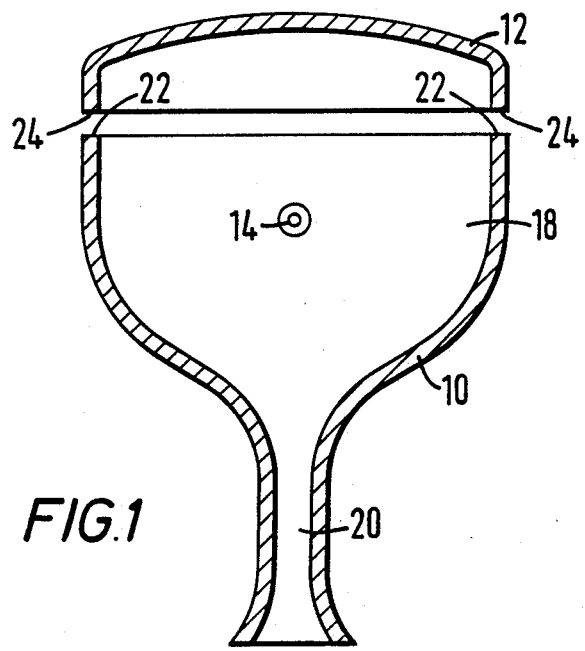
FIG. 1 shows a cathode ray tube (CRT), more specifically a CRT intended to form a picture tube for a color television receiver, in the course of construction.

A method embodying the invention for separating the funnel 10 and panel 12 of a CRT of the kind described above with reference to FIG. 1 will now be described with reference to FIGS. 2 and 3. In practice, a batch of several CRTs may be treated simultaneously. For simplicity, however, the treatment of only one CRT will be described.

The CRT is disposed as shown in a bath 30 containing an aqueous solution of nitric acid 32 so that the junction of the funnel 10 and panel 12 is immersed in the acid. The CRT is supported in position by suitable support means (not shown). The concentration of the acid may, as in the known process described above, be 5%. However, a lesser concentration, down to as little as 2%, has been found satisfactory. As shown, the neck portion 20 of the CRT is still sealed and therefore it still contains the electron gun. However, the lower end of the neck may have been cut off and the electron gun removed before the CRT is placed in the bath 30.

A plurality of piezoelectric transducer heads 34, each encased in stainless steel, are immersed in the nitric acid 32 in the bath 30 and are connected via a multiplexer (not shown) to an ultrasonic frequency generator (not shown) so that, when energized, they subject the acid 32 to ultrasonic excitation. Preferably, as shown, the transducer heads 34 are disposed to provide maximum excitation of the nitric acid in the region of the junction of the funnel 10 and the panel 12 of the CRT, maximum emanation of ultrasound preferably occurring from the faces of the heads 34 that confront the junction. Specifically, at least one respective transducer head 34 is disposed along and facing each of the four sides of the CRT. As indicated above, the destructive effect of the nitric acid on the adhesive holding together the funnel 10 and panel 12 is intensified by the ultrasonic agitation of the acid so that the adhesive bond quickly is destroyed. After a predetermined period of time sufficient to ensure the destruction of the adhesive bond, the CRT is lifted out of the bath 30 so that the panel 12 can be lifted from the funnel 10, whereupon the funnel 10 and/or the panel 12 can be cleaned (stripped of their various coatings) and re-used to make another CRT. The period of time employed will depend upon a number of factors, including the size of the tube, the nature of the adhesive bond, the positioning of the transducer heads 34 and the amount of ultrasonic power employed. Laboratory tests have shown a period of six minutes to be adequate. However, these tests used low power transducers which were not arranged optimally with respect to the junction of the funnel 10 and panel 12. In a full scale apparatus, it is expected that the total processing time will be considerably less than six minutes.

The amount of ultrasonic power generated appears not to be critical. Generally speaking, within reasonable limits, the power is made as high as possible in order to promote quick destruction of the adhesive bond.

Tests have shown that an ultrasonic frequency of 45 kHz is satisfactory. However, the frequency appears not to be critical, so that other frequencies can be employed.

Figure 2:
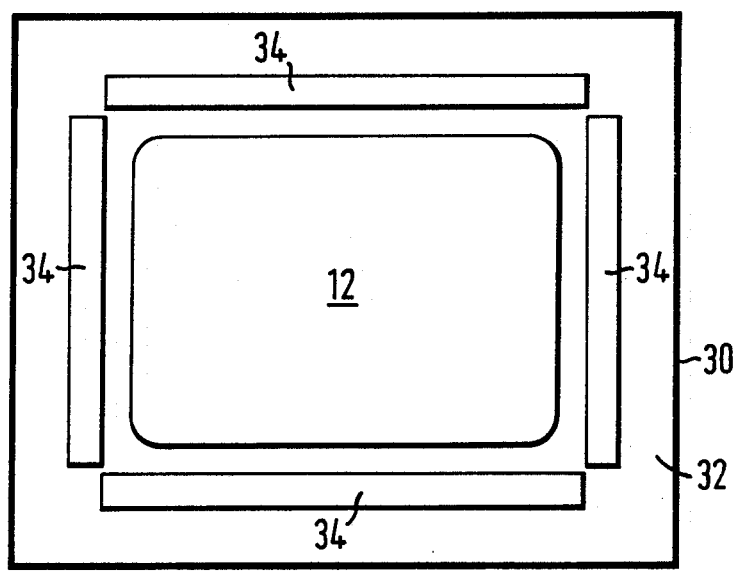
FIG. 2 is a schematic plan view from above of a CRT disposed in a nitric acid bath.
Figure 3:
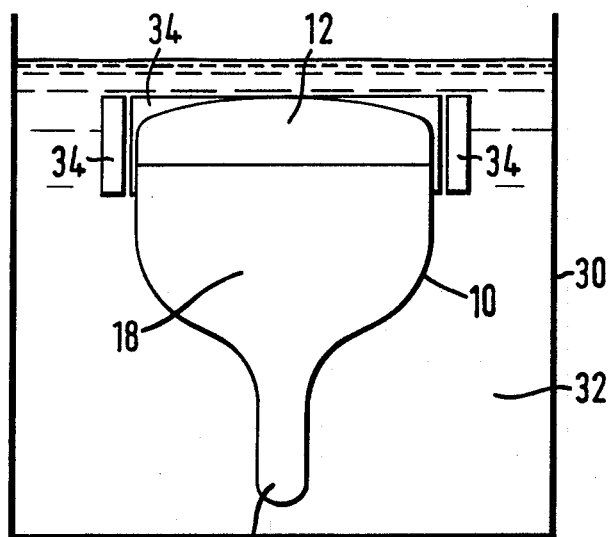
FIG. 3 is a schematic side sectional view of the CRT disposed in the nitric acid bath.

The CRT does not need to be oriented in the bath 30 in the position shown in FIGS. 2 and 3. It could, for example, be positioned the other way up, so that the panel 12 will drop off when separation occurs. Neither is it necessary for the CRT to be fully immersed: it is sufficient that the junction between the funnel 10 and panel 12 be immersed.

The transducer heads 34 are, as indicated above, preferably positioned adjacent the junction between the funnel 10 and the panel 12 so as to maximize the ultrasonic agitation of the nitric acid 32 at the junction. However, the method would still function, albeit perhaps less efficiently, using one or more transducer heads positioned elsewhere in the bath, forming part of a wall or walls of the bath, or even positioned outside of the bath.

As indicated above, the salvaged funnel 10 and/or panel 12 must be cleaned before it can be used. That is to say, the carbon (graphite) coatings must be removed from the interior and exterior of the funnel 10 and/or the carbon, phosphors and aluminum must be removed from the panel 12. In the case of the funnel 10, the carbon coating may be removed by a technique known in the art, according to which the coatings, which are soluble in hydrofluoric acid (HF), are removed by spraying the interior and exterior of the funnel with HF. However, this technique has the disadvantages that it is time consuming (the HF taking about 20 minutes or so to remove the coatings), and that HF is both expensive and, by virtue of its corrosive nature, difficult and dangerous to handle. Preferably, therefore, the funnel 10 and/or panel 12 is cleaned by a method which is described and claimed in my copending UK Patent Application No. 8527489 filed Nov. 7, 1985 and in my corresponding copending U.S. patent application Ser. No. 829,167 which was filed on the same date as the present application, the disclosure of which is hereby incorporated herein by reference. Reference should be made to the copending application for a full disclosure of the cleaning (coating removal) method. The method will, however, be disclosed in outline below, considering the case in which it is the funnel 10 that is to be cleaned so that it can be salvaged.

The carbon coatings as applied to the inside and outside of the funnel 10 all comprise carbon (graphite) in a liquid binder and can be applied to the respective portions of the funnel by spraying or rolling, after which they are cured or set by heating. As is known to these skilled in the art of CRT manufacture, the various different coatings are available in liquid form from specialist suppliers, for instance from Acheson Colloids under the trademark "ELECTRODAG". The precise composition of the various carbon coatings will be determined by various factors, including the size of the CRT and its intended quality. By way of example, however, the coating as applied to the interior of the main body portion 18 of the funnel 10 may be (in parts by weight): 22% graphite, 10% potassium silicate and 68% water; while that applied to the interior of the neck portion 20 may be: 1 kg of graphite and 220 g of silicon carbide to 750 ml of water glass. In any event, as indicated above, it is known that all of these coatings, when cured or set, are soluble in HF.

I have determined that the coatings also all are soluble in alkaline liquids, for example (but not exclusively) sodium hydroxide (NaOH). NaOH is, of course, much cheaper and more generally available than HF and easier to handle than HF. Moreover, if the funnel 10 is immersed in a bath of an alkaline liquid and the liquid is excited ultrasonically in a manner similar to that described above with reference to FIGS. 2 and 3, the corrosive effect of the alkaline liquid can be speeded up greatly, so much so that the funnel can be cleaned of its various graphite coatings in only one to two minutes or so. In fact, it is anticipated that a salvage apparatus that firstly separates the funnel 10 from the panel 12 by the method described above with reference to FIGS. 2 and 3 and then removes the carbon coating by the method just described can salvage a funnel in only about four to five minutes, compared with the forty-five minutes or so taken in the case of the known separation and cleaning methods described above. The overall salvaging method is therefore so fast and trouble-free that it makes salvage of the CRT components much less expensive. In fact, it may even become feasible economically to collect worn-out tubes from television repair establishments and send them back to the television factory for salvaging together with CRTs found to be defective during manufacture.

An example of how the carbon (graphite) coatings can be removed from the exterior and interior of the funnel 10 of the CRT will now be described with reference to FIG. 4. After it has been separated from the panel 12 and rinsed, the funnel 10 is immersed fully, as shown, in a bath 40 containing an alkaline liquor 42. Preferably (but not essentially), as shown, the lower end of the neck portion 18 of the funnel and the electron gun previously have been removed. The liquor 42 may comprise, for example, in parts by volume: 55% NaOH; 5 to 10% sodium carbonate ($Na_2CO_3$) and the rest water. The $Na_2CO_3$ acts essentially as a detergent to help free particles of the coatings removed by the corrosive action of the NaOH.

A plurality of piezoelectric transducer heads 44, each encased in stainless steel, are immersed in the liquor 42 in the bath 40 and are connected via a multiplexer (not shown) to an ultrasonic frequency generator (not shown) so that, when energized, they subject the liquor 42 to ultrasonic excitation. (It has been ascertained that stainless steel will withstand the corrosive effect of alkalis such as NaOH for a long time, whereas if HF were used the transducer heads would be destroyed so quickly as to make the cleaning method uneconomical). Preferably, as shown, the transducer heads 44 are disposed so as to approximately equally insonify the different parts of the funnel 10. The destructive (corrosive) effect of the alkaline liquor 42 on the carbon coatings is intensified by the ultrasonic agitation of the liquor so that the coatings are removed quickly, possibly in around one to two minutes. The funnel is then removed from the bath 40 and rinsed. Then, after welding on a new lower end part to the neck portion 18, it is ready to be put back on the production line to be used in making another CRT.

Figure 4:
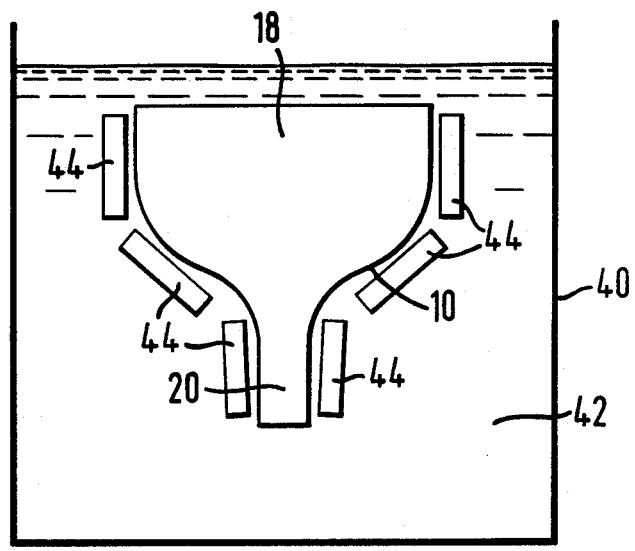
FIG. 4 is a schematic side section view of a funnel of the CRT disposed in an alkaline liquid bath.

The method of FIG. 4 can be varied in similar manner to that of FIGS. 2 and 3. Thus: the amount of ultrasonic power employed is preferably as high as possible; the frequency can be 45 kHz, though this is not critical; the funnel 10 can be oriented in the bath 40 in any desired way; and one or more of the transducer heads 44 can be positioned in other positions than these shown, elsewhere in the bath 40, forming part of a wall or walls of the bath, or even outside of the bath.

A method similar to that described with reference to FIG. 4 can be used to clean the panel 12. In this connection, it has been found that an ultrasonically excited alkaline liquor will also remove the phosphor, aluminum and carbon (graphite) coatings on the panel 12.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A method of separating a glass panel and a glass body of a cathode ray tube, said panel and said body being secured together at a junction by an adhesive comprising a frit and a binder susceptible to attack by nitric acid, said method comprising the steps of:

at least partially immersing said cathode ray tube in a bath containing nitric acid such that at least said junction is immersed in said bath;

ultrasonically exciting the nitric acid in said bath using at least one ultrasonic transducer; and relatively disposing said at least one transducer and said cathode ray tube in said bath to maximally excite said nitric acid in said bath in the region of said juction to promote attacking of said binder by said nitric acid and separation of said panel and said body.

2. A method according to claim 1, in which said ultrasonic excitation is effected by means of at least one transducer that forms part of a wall of said bath.

3. A method according to claim 2, wherein said at least one transducer is so disposed as to provide maximum excitation of the nitric acid in the region of the junction of said body and said panel.

* * * * *